(12) United States Patent
Luick

(10) Patent No.: US 7,302,524 B2
(45) Date of Patent: Nov. 27, 2007

(54) ADAPTIVE THREAD ID CACHE MECHANISM FOR AUTONOMIC PERFORMANCE TUNING

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 10/670,717

(22) Filed: Sep. 25, 2003

(65) Prior Publication Data

US 2005/0071535 A1    Mar. 31, 2005

(51) Int. Cl.
*G06F 12/00* (2006.01)
(52) U.S. Cl. .................... 711/118; 711/128; 711/133; 711/134; 711/214; 711/220
(58) Field of Classification Search ............. None
See application file for complete search history.

(56) References Cited

U.S. PATENT DOCUMENTS 6,874,056 B2 *   3/2005   Dwyer et al. ............... 711/3
2006/0195683 A1 *   8/2006   Kissell ..................... 712/228

\* cited by examiner

*Primary Examiner*—Sanjiv Shah
*Assistant Examiner*—Midys Rojas
(74) *Attorney, Agent, or Firm*—Bockhop & Associates

(57) ABSTRACT

An apparatus and method for inhibiting data cache thrashing in a multi-threading execution mode through simulating a higher level of associativity in a data cache. The apparatus temporarily splits a data cache into multiple regions and each region is selected according to a thread ID indicator in an instruction register. The data cache is split when the apparatus is in the multi-threading execution mode indicated by an enable cache split bit.

6 Claims, 3 Drawing Sheets

ADAPTIVE THREAD ID CACHE MECHANISM FOR AUTONOMIC PERFORMANCE TUNING

BACKGROUND OF THE INVENTION

1. Field of the Invention

The present invention generally relates to computing devices, more specifically, the present invention relates to a processor architecture having an improved caching system.

2. Description of the Related Art

Memory access is essential in any computer system and substantially affects the performance of a computer system. Much advancement has been made to improve memory access and among them, use of cache memory to store data that is most likely to be next accessed in fast-coupling memory typically on the main processor.

Cache memory improves computer's performance when a desired data is found in the cache memory, but the cache memory does not contain all the data needed for a particular application. Where a cache miss occurs, i.e., a needed data is not found in the cache memory, the needed data must be brought in from another slower memory and data from the cache memory must be removed to yield the space for this needed data.

Cache misses increase especially when a computer is executing in a simultaneous multi-threading mode. In a multi-threading mode, multiple applications access the memory simultaneously and a cache miss by one application may thrash the cache for a second application by removing a data needed by the second application and thus causing a cache miss for the second application.

As the size of cache memory increases, each cache memory access yields more than one set of data. For example, in a 32 KB cache memory, each access retrieves two pieces of data. After the two pieces of data is retrieved from the cache memory, additional steps must be taken to select one of them for the application's use, thus adding more delay to the data access. This additional delay becomes especially aggravated when the number of data simultaneously retrieved increases.

SUMMARY OF THE INVENTION

The invention introduces a way to inhibit data cache thrashing during a multi-threading execution mode through simulating a higher level of associativity in a data cache. An apparatus according to the invention includes at least one instruction register having a thread ID indicator, an address generator having a cache index indicator and a plurality of cache index bits, a cache memory, and a selector for selecting between the thread ID indicator and the cache index indicator. The selector outputs an upper index indicator. When the thread ID indicator is selected by the selector, the thread ID indicator is output to the upper index indicator, and the upper index indicator is concatenated with the plurality of cache index bits to form an address for retrieving an entry from the cache memory.

In another aspect, the invention is a method for inhibiting data cache thrashing in a multi-threading execution mode through simulating a higher level of associativity in a data cache. The method includes the steps of loading at least one instruction register having a thread ID indicator, generating an effective address having a cache index indicator and a plurality of cache index bits, selecting an upper index indicator between the thread ID indicator and the cache index indicator, forming an address by concatenating the upper index indicator with the plurality of cache index bits, and retrieving an entry from the cache memory indicated by the address.

Other objects, advantages, and features of the present invention will become apparent after review of the hereinafter set forth in Brief Description of the Drawings, Detailed Description of the Invention, and the Claims.

DETAILED DESCRIPTION OF THE INVENTION

In this description, like numerals refer to like elements throughout the several views. The invention temporarily divides a cache to inhibit thrashing and to simulate the performance of higher level associativity. The cache is divided using thread ID bits without requiring extra select time.

Figure 1A:
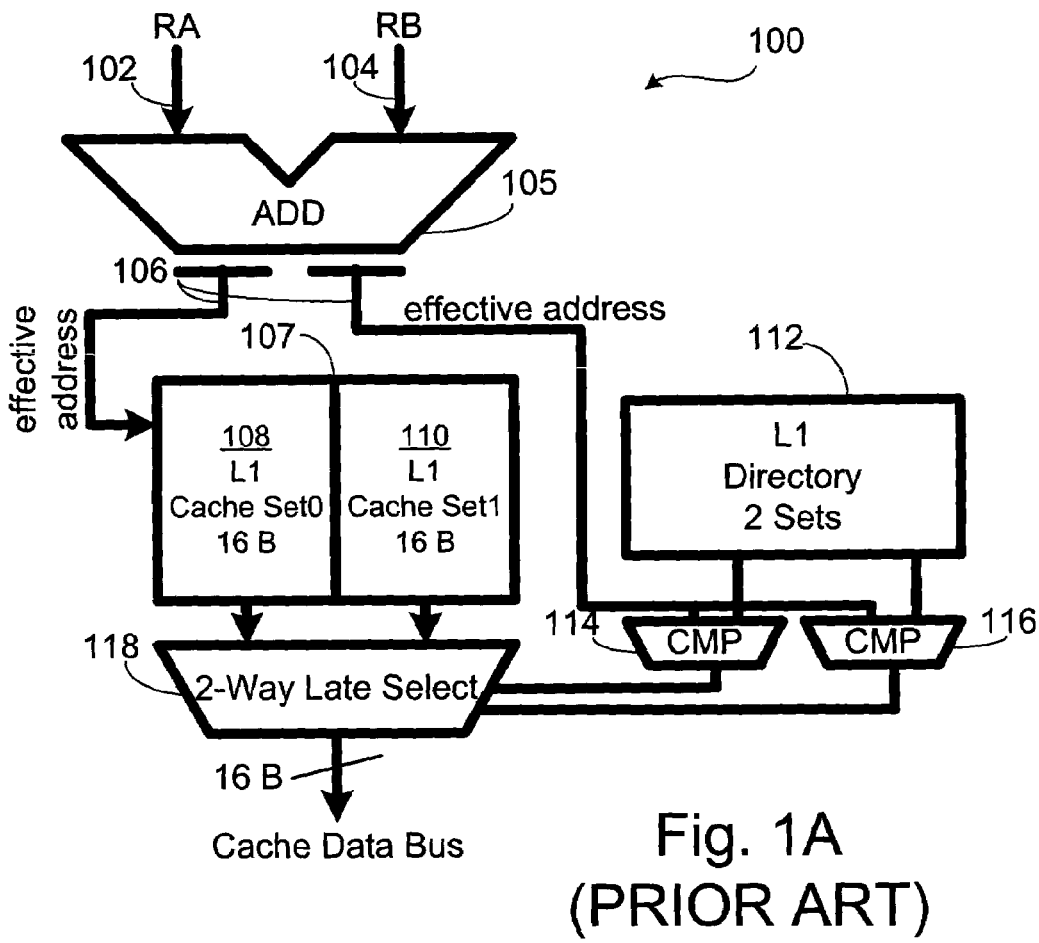
FIGS. 1A-B illustrate a prior art architecture for a cache access.

Generally, a one level (L1) cache is unable to implement a high set associativity to support a simultaneous multi-threading execution mode without significant costs in area, power, additional access latency, and significant redesign resource and schedule. FIG. 1A illustrates a problem with a L1 cache. An address generator 105 generates an effective address 106 using information from two registers RA 102 and RB 104. The effective address 106 is fed to a cache memory 107 having two sets of data 108 and 110. The effective address is connected to two comparators 114 and 116 for use in a 2-way late selecting unit 118, which will select which data to output to a cache data bus.

Figure 1B:
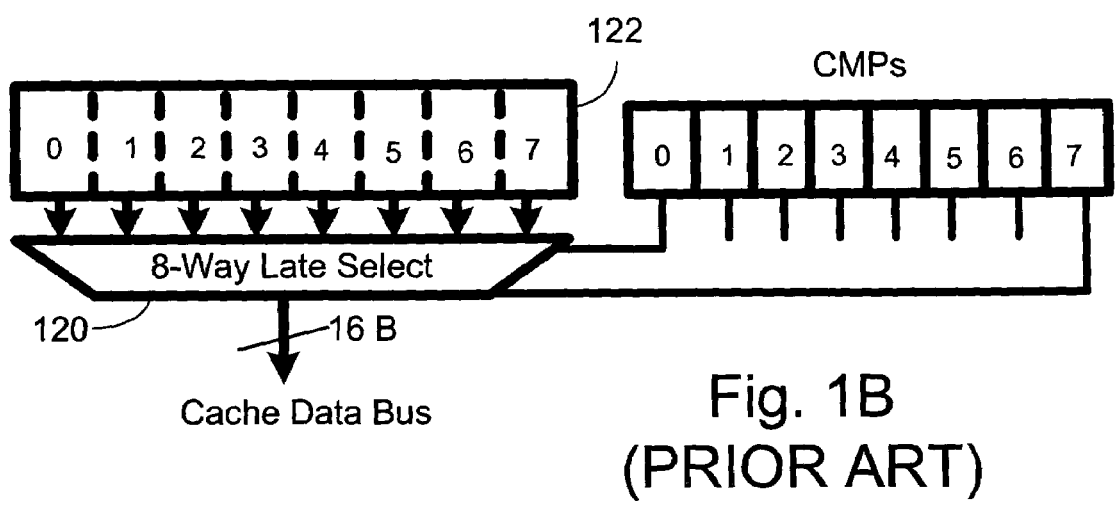

The late selecting unit can become more complex if more data are needed from a single cache memory access. FIG. 1B illustrates an example, when eight comparators will be needed if eight pieces of data 122 are retrieved from the cache memory, and a 8-way late selecting unit 120 is needed.

Figure 2:
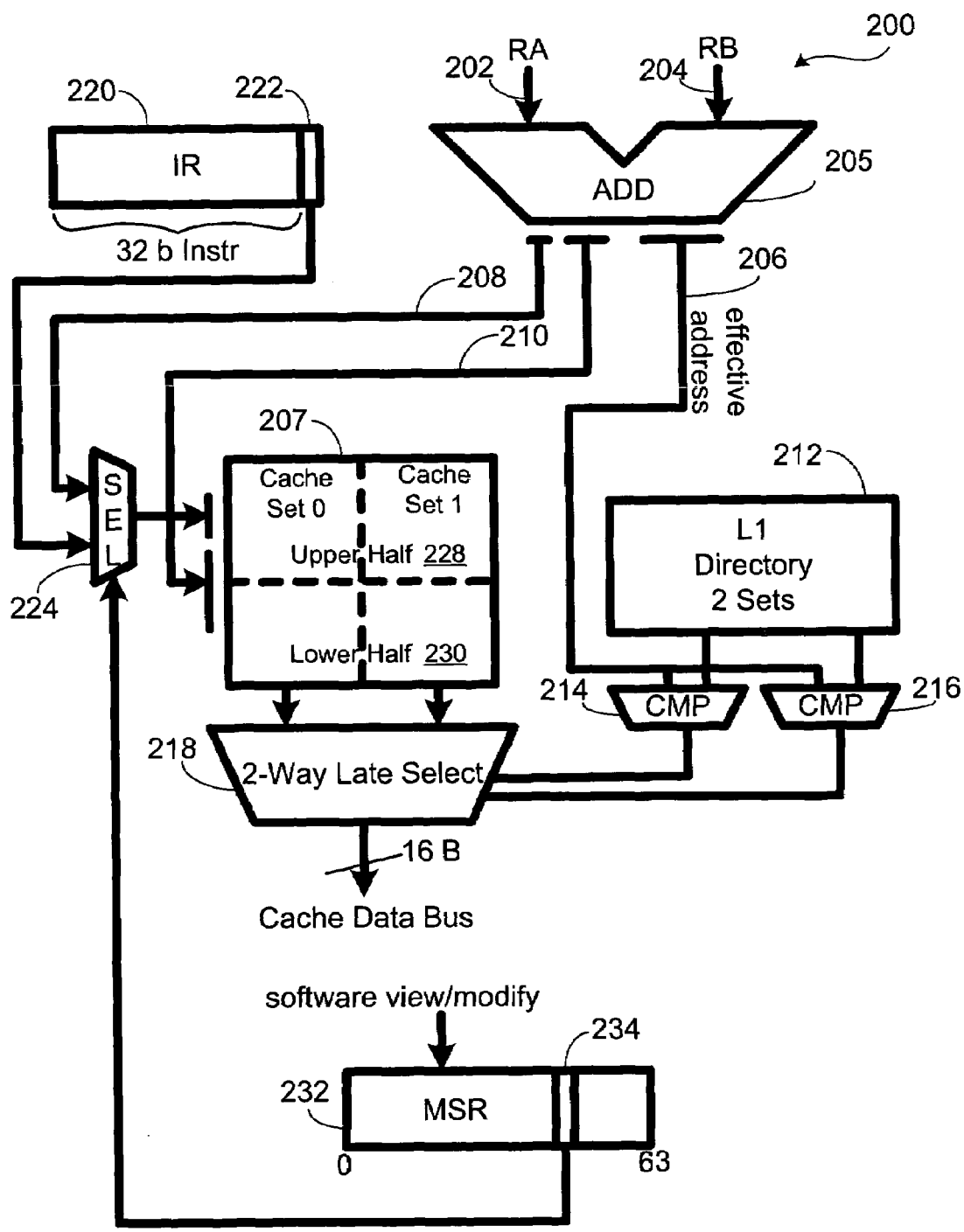
FIG. 2 illustrates architecture for a cache access according to the invention.

FIG. 2 illustrates an architecture 200 according to the invention. A thread ID indicator 222 is added to an instruction register 220. Although only one instruction register 220 is shown, there can be more than one instruction register when the system is in the multi-thread execution mode. The thread ID indicator can one bit or more bits depending how a cache memory is used during a multi-thread execution mode. This thread ID indicator 222 and bit 0 of an effective address from the address generator 205 are connected to a selector 224. Bit 0 of the effective address, shown as element 208, is also known as the cache index indicator. The rest of bits from the effective address are the cache index bits 210. The selector 224 is controlled by a bit (enable cache split indicator) 234 from a machine state register (MSR) 232 and the selector 224 selectively allows either the thread ID indicator or cache index bit 0 be connected to its output. This output (upper index indicator) is concatenated with the cache index bits 210 from the effective address to form an index into the data cache 207.

If the system is in a multi-thread execution mode and the operating system, or hardware, is aware of an application that may cause thrashing, the enable cache split indicator 234 will be set, which in turn directs the selector 224 to connect the thread ID indicator 222 to the selector's output.

An application may cause thrashing if it involves technical streaming, i.e., loop operation that involves heavy computation, and this may be indicated by a streaming bit being set by the operating system. The thread ID indicator 222 divides the cache 207 into two halves, upper half 228 and lower half 230. The index formed by the thread ID indicator 222 and the rest of effective address 210 retrieves a set of data from either upper half 228 or lower half 230. The 2-way late selecting unit 218 then selects either a data from cache set 0 or cache set 1 to be output onto the cache data bus.

The enable cache split bit 234 is set by the operating system when the cache 207 is divided to support the multi-thread execution mode. By setting the enable cache split bit 214 and using the thread ID indicator 222, the 2-way late selecting unit 218 can be kept simple and have minimal delay.

The embodiment shown in FIG. 2 minimizes cache thrashing when a cache miss from a first application causes a data needed by a second application to be discarded. By setting the enable cache split bit, dividing the cache into different regions, and associating these regions with different applications, the thrashing is minimized without incurring additional delays with the late selecting unit.

Figure 3:
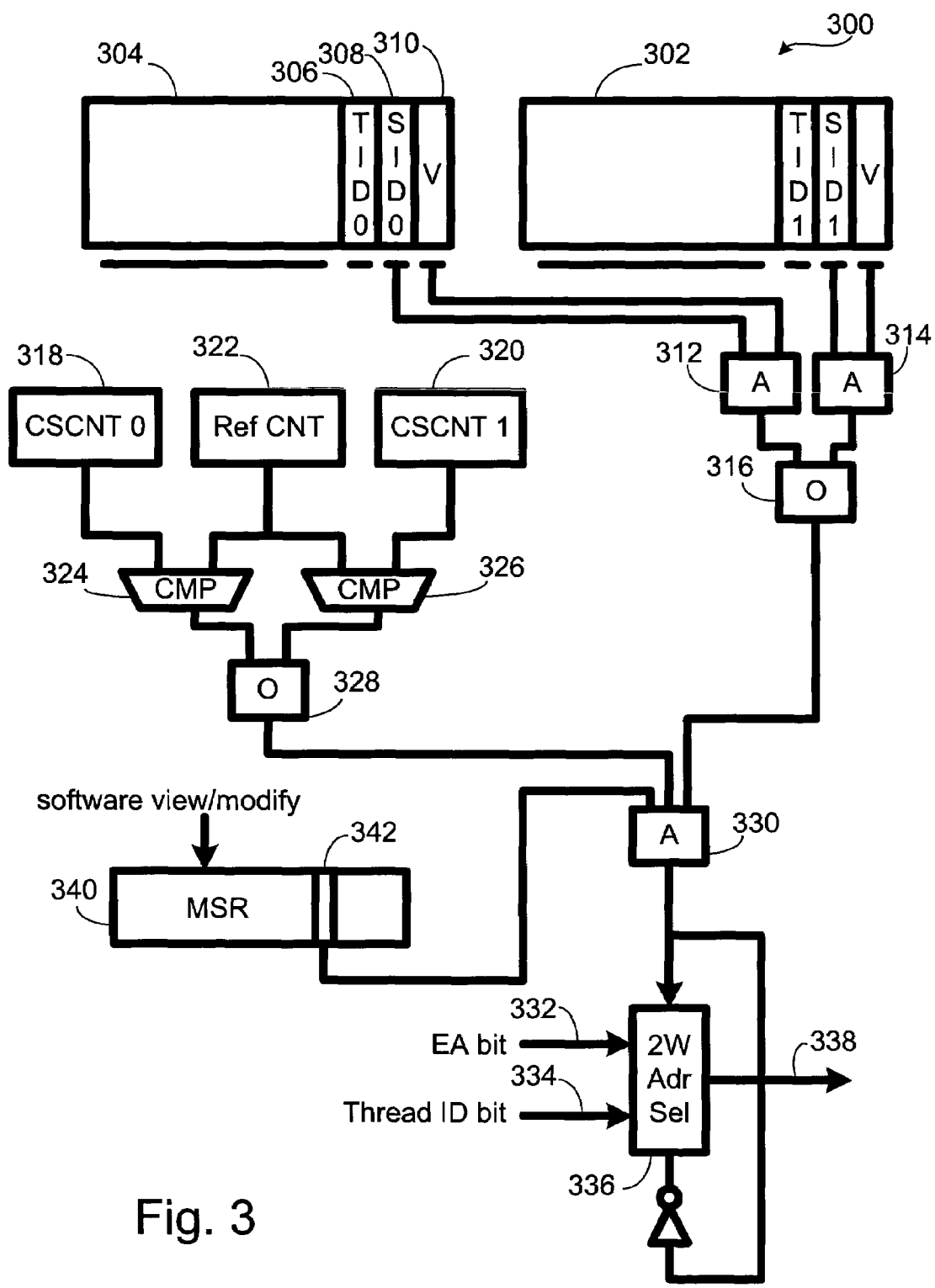
FIG. 3 illustrates an alternative architecture for a cache access.

FIG. 3 illustrates an alternative embodiment 300 for dynamically splitting the cache. A system may be in a cache thrashing situation if there is a substantial number of cache misses. For a system with two applications running, two cache miss counters 318 and 320 can be set up, one for each application. If application 1 has a cache miss, then counter 320 is incremented. If application 0 has a cache miss, then counter 318 is incremented. The cache miss counters are compared with a reference counter 322. Each cache miss counter 318, 320 is reset when a new application start is started.

Instructions for each application is loaded in one instruction register, and for a system that supports two simultaneous applications two instruction registers 302, 304 are used. The two instruction registers 302, 304 are identical. The instruction register 304 has a stream ID indicator 308 to indicate the application is in stream mode, i.e., in a computational loop. The stream ID indicator 308 is set by hardware or the operating system. The instruction register 304 also has a valid bit 310 that is normally set to indicate that instruction in the instruction buffer is valid. The valid bit 310 is unset by hardware if there is a branch condition or a cache miss.

If either instruction register has the stream ID indicator 308 set and the valid bit 310 unset and either cache miss counter exceeds the reference counter 322 and the enable cache split bit 342 also set, then the 2-way late selecting unit 336 will select the thread ID indicator 334. The thread ID indicator 334 is from an instruction register currently accessing the cache memory.

Although the invention is described in scenarios supporting one or two threads, the invention can be easily implemented to support more threads without departing from the spirit of the invention.

In the context of the invention, the method may be implemented, for example, by operating portion(s) of a computing device to execute a sequence of machine-readable instructions. The instructions can reside in various types of signal-bearing or data storage media. The media may comprise, for example, RAM registers, or other memory components of the processor.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. An apparatus for inhibiting data cache thrashing in a multi-threading execution mode through simulating a higher level of associativity in a data cache, comprising:
   at least one instruction register, the at least one instruction register having a thread ID indicator;
   an address generator having a cache index indicator and a plurality of cache index bits;
   a cache memory;
   a selector for selecting between the thread ID indicator and the cache index indicator, the selector outputting an upper index indicator, and
   at least one cache miss counter, the at least one cache miss counter counting cache misses, wherein the at least one cache miss counter controls the selector;
   and wherein when the thread ID indicator is selected by the selector, the thread ID indicator is output to the upper index indicator, and the upper index indicator is concatenated with the plurality of cache index bits to form an address for retrieving an entry from the cache memory.

2. The apparatus of claim 1, further comprising a machine state register, the machine state register having an enable cache split indicator that, at least, controls the selector.

3. The apparatus of claim 1, wherein each thread ID indicator further comprises a plurality of bits.

4. The apparatus of claim 1, wherein each thread ID indicator further comprises a single bit.

5. A method for inhibiting data cache thrashing in a multi-threading execution mode through simulating a higher level of associativity in a data cache, comprising the actions of:
   loading at least one instruction register, the at least one instruction register having a thread ID indicator;
   generating an effective address having a cache index indicator and a plurality of cache index bits;
   selecting an upper index indicator between the thread ID indicator and the cache index indicator;
   forming an address by concatenating the upper index indicator with the plurality of cache index bits;
   retrieving an entry from the cache memory indicated by the address;
   checking an enable cache indicator in a machine state register;
   if the enable cache indicator is set, selecting the thread ID bit; and
   if the enable cache indicator is not set, selecting the cache index indicator.

6. The method of claim 5, wherein the step of selecting an upper index indicator further comprises the steps of:
   counting cache misses;
   if the number of cache misses exceeds a predefined limit, selecting the thread ID bit; and
   if the number of cache misses is less than the predefined limit, selecting the cache index indicator.

* * * * *